(No Model.) 2 Sheets—Sheet 1.
W. C. HAZLIP.
CANE JUICE STRAINING DEVICE.
No. 460,867. Patented Oct. 6, 1891.
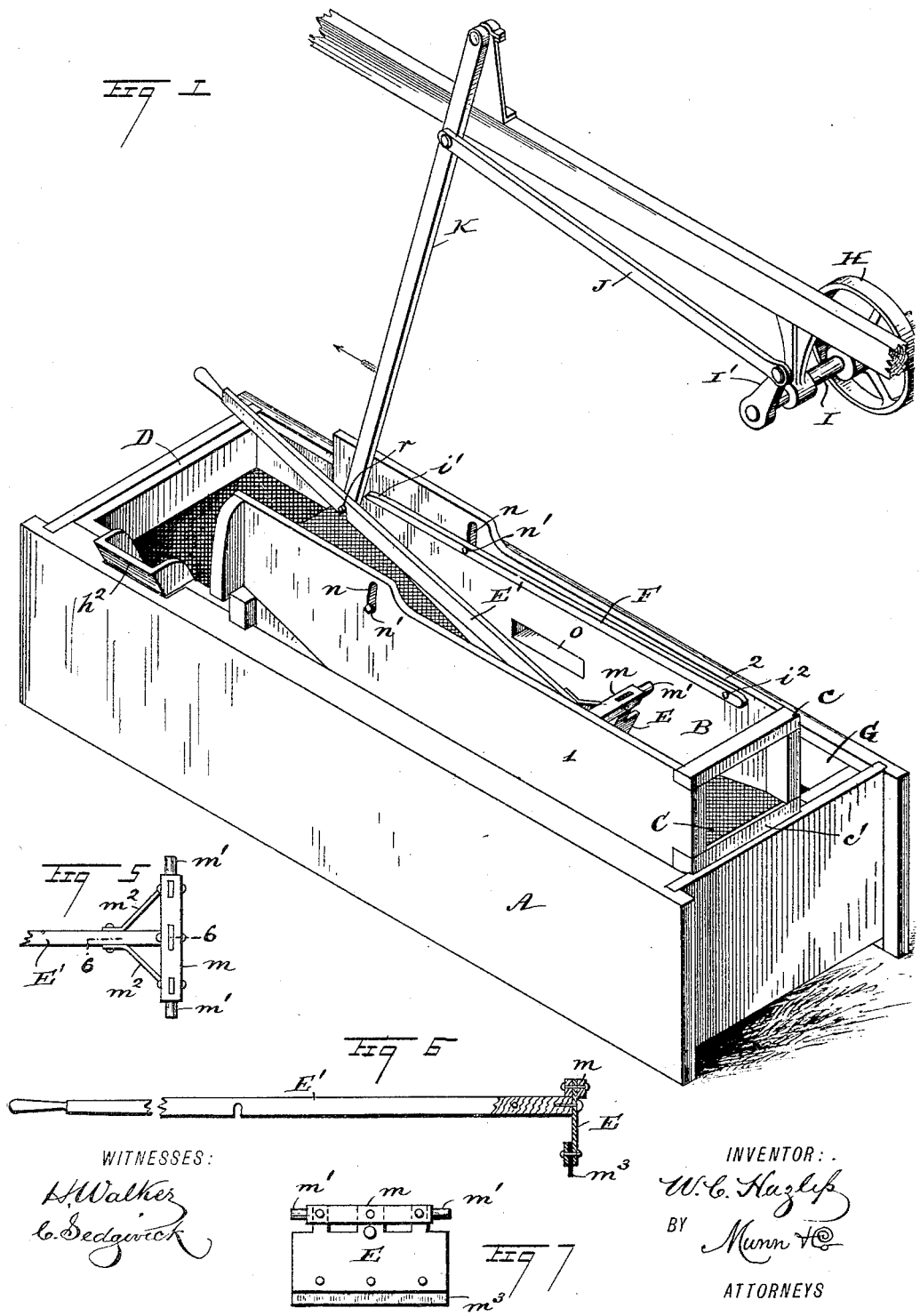
WITNESSES:
H. Walker
C. Sedgwick
INVENTOR:
W. C. Hazlip
BY
Munn & Co.
ATTORNEYS

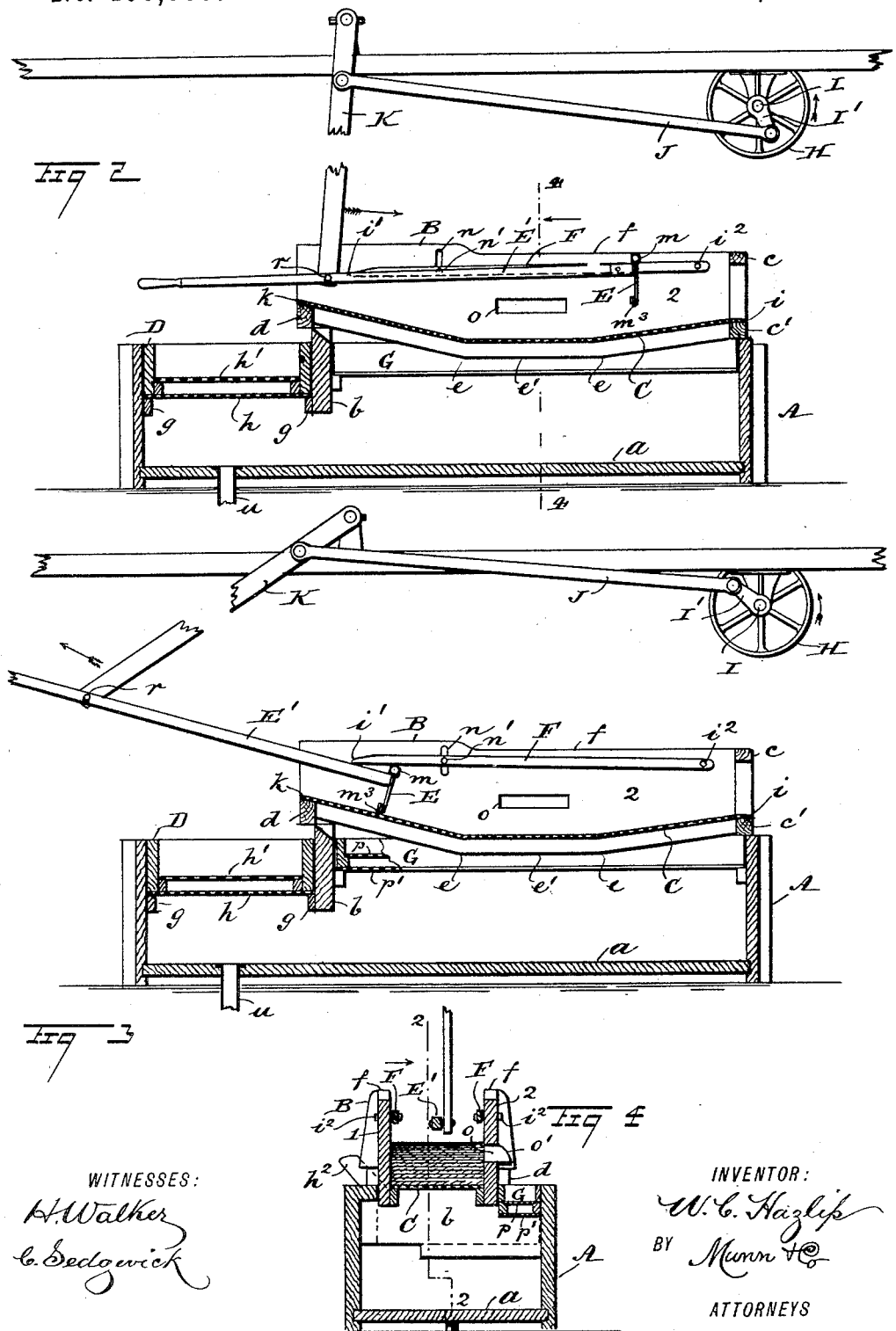

UNITED STATES PATENT OFFICE.

WALTER C. HAZLIP, OF BRUSLY LANDING, LOUISIANA.

CANE-JUICE-STRAINING DEVICE.

SPECIFICATION forming part of Letters Patent No. 460,867, dated October 6, 1891.

Application filed January 5, 1891. Serial No. 376,786. (No model.)

*To all whom it may concern:*

Be it known that I, WALTER C. HAZLIP, of Brusly Landing, in the parish of West Baton Rouge and State of Louisiana, have invented a new and useful Improvement in Cane-Juice-Straining Devices, of which the following is a full, clear, and exact description.

This invention relates to a device for straining cane-juice, and has for its objects to provide a simple, practical, and inexpensive device, which may be manually operated or receive power and motion from other sources that will actuate its working parts and effectually separate fragments of sugar-cane and other refuse matter from the cane-juice as it flows from the crushing-rolls of a sugar-mill.

To these ends my invention consists in certain features of construction and combinations of parts, as hereinafter described and claimed.

Reference is to be had to the accompanying drawings, forming a part of this specification, in which similar letters and figures of reference indicate corresponding parts in all the views.

Figure 1 is a perspective view of the device. Fig. 2 is a longitudinal section on the line 2 2 in Fig. 4. Fig. 3 is a longitudinal section taken on the line 2 2 in Fig. 4, showing the working parts in a different position from that shown in Fig. 2. Fig. 4 is a transverse section on the line 4 4 in Fig. 2. Fig. 5 is an enlarged detached plan view of the rake and its pusher bar or handle, the latter being shown broken. Fig. 6 is a side view of the rake in section on the line 6 6 in Fig. 5, and an attached pusher-bar; and Fig. 7 is a front end view of the rake.

The base of the device consists of a preferably rectangular elongated box-like structure A, of suitable dimensions, having an open top and closed bottom $a$, whereby it is adapted to receive cane-juice.

Upon the juice-receiver A the main strainer-frame B is supported by engagement of its lower edge near the ends with one end of the receiver A, and also with a cross-bar $b$, that is affixed in the latter at a proper point. The strainer-frame B is formed as an elongated box with open ends shorter than the juice-receiver A, whereby a space is afforded at one end of said receiver, for a purpose which will be explained. The side walls 1 2 of the strainer-frame B are parallel, and are so retained by a top cross-bar $c$ and an aligning bottom cross-bar $c'$ at one end of the frame, there being also a bottom cross-bar $d$ at its opposite end, the upper portion of the frame at the end whereon the bar $d$ is affixed being free of any obstruction. The lower edges of the walls 1 2 are cut, as represented in Figs. 2 and 3, forming inclines from the ends of a slightly-different pitch, which terminate at the points $e$ about an equal distance from said ends, where the downwardly and inwardly sloping portions of the lower edges of the side walls join portions $e'$, which are central, longitudinally considered, and are parallel with the upper edges $f$.

On the lower edges of the side walls 1 2 a strainer C, of screen wire-cloth, is secured, that extends from end to end of the frame B, which screen, from the form of the edges whereon it is placed, is depressed near the center of length and slopes upwardly toward each end from the level portion, which ends $i\ k$ receive and discharge the bagasse and other refuse, while the juice passes through the strainer into the lower portion of the juice-receiver A.

There is a removable rectangular screen-frame D, located at one end of the juice-receiver A upon transverse ledges $g$, which frame D is covered with a screen $h$, of proper mesh, on its lower edge, and, if desired, a removable screen $h'$, of a coarser mesh, may be placed within the frame D above the screen $h$. The screen-frame D is located on a lower plane than that of the screen C, so that refuse material from the latter may be expelled from its open end $k$ and fall upon the screen $h'$, or $h$ if the coarse screen is not provided.

The device shown detached in Figs. 5, 6, and 7 is termed a "rake," its office being to scrape the strainer C clean, keeping its meshes open thereby for the free discharge of cane-juice through it into the receptacle below, it further serving to remove bagasse and other heavy impurities that comes from the crushing-rolls (not shown) with the juice. The rake portion E is composed of a flat piece of material of proper width and height proportioned to the dimensions of the strainer-frame B, so that it will slide when located transversely between the parallel walls of said frame. The head-block of the rake, as the piece just described is designated, is secured to a bar $m$, parallel thereto, in a manner to afford a space between the rounded projecting ends $m'$ of said bar and the top edge of the head-block.

Upon the bar $m$ near its center of length a handle or pusher-bar $E'$ is attached by one end, so as to project therefrom at right angles to the head-block E. Said bar $E'$ is laterally braced on the parallel bar $m$ by the diagonal rods $m^2$, which are secured by their ends to said parts, as shown in Fig. 5.

A slightly-yielding lower edge $m^3$ is provided for the head-block E by the attachment thereto of a strip of leather or similar substance, which is clamped fast to the head-block, as shown in Fig. 6.

Two similar guide-bars F are provided, which consist of strips, preferably of metal, that are pivoted by one end of each at opposite points $i^2$ on the inner surface of the side walls 1 2 of the strainer-frame B, near the front end $i$ of the screen C, and extend toward and near to the opposite end $k$ of the strainer-frame, said guide-bars having the studs $n'$, projected from their inner surfaces near their free ends $i$, which studs enter vertical slots $n$, formed in the sides of the frame B.

The main strainer-frame B is of less width than its support A, and is nearer to one side of the same, thereby affording space on the opposite side for the location of an oblong screen-frame G. The side 2 of the frame B has a slot $o$ cut in it near the center of length and height to allow an overflow-discharge of cane-juice through the slot, and an attached chute $o'$ into the screen-frame G, if the main strainer-frame should be accidentally flooded or the meshes of its strainer temporarily clogged.

There may be one or two screens $p\ p'$ provided for the screen-frame G, as may be preferred, and said frame should be so supported that it may be readily removed when it is desired to clean it and its screen.

At one side of the screen-frame D previously described, a chute $h^2$ is formed for the removal of any coarse material, such as bagasse, which may be scraped from the surface of the screen upwardly and outwardly through the chute by a suitable implement.

Any adequate source of power may be employed to actuate the rake E and move it endwise, the preferred means for effecting a reciprocation of the rake and its pusher-bar $E'$ consisting in the provision of a revolubly-suspended driving-pulley H, that may be engaged by a power-driven belt, (not shown,) said pulley having a support on a crank-shaft I, the crank $I'$ of which is pivotally engaged with one end of a connecting-rod J.

At a proper point removed from the pulley H a pendent lever K is pivoted by its upper end portion to a stable support, which may be the same that sustains the pulley, said lever having a lateral pin $r$, projected from its lower end toward the pusher-bar $E'$, that is notched on its lower edge to hook over said pin or be removed therefrom, if desired.

In operation, motion being given to the pulley H, the vibration thus produced of the lever K will actuate the rake E through its pusher-bar $E'$. When the rake E is at the end $k$ of the strainer-frame B, it will be so elevated with regard to the guide-bars F that the bar $m$ on the rake will have its lower edge located in a plane above the sloped ends $i'$ of the guide-bars, so that a progressive movement of the rake toward the opposite end $i$ of the frame B will cause the bar $m$ to ride upon the guide-bars and hold the edge of the rake off of the strainer or screen C until the ends $i^2$ of the guide-bars are reached, when the rake-head will drop and rest its edge $m^3$ upon the strainer. A reversed movement of the rake will now be effected by its connection with the source of power, as has been explained, and cause the rake to engage all impurities of a coarse nature within the strainer-frame B, drawing it toward the end $k$ of said frame and expelling it to drop upon the screen in frame D. The described operation will be repeated as long as the connections of the rake E with the lever K is maintained.

The depth of the liquid on the strainer C, if the latter is unclogged, will not reach the discharge-slot in the side 2 of the strainer-frame B; but if from any cause the liquid fails to flow through the strainer freely the surplus will pass out of said slot upon the screen-frame below it. At any time the movement of the rake E can be arrested, if necessary, by simply lifting the pusher-bar $E'$ at its handle end, and the rake used manually or be entirely removed from the frame B.

The flow of the juice being conducted to the strainer-frame B directly from the rolls (not shown) through a trough or other conduit, by gravity, and the straining operation described being automatically effected, the labor usually employed is reduced. Loss of juice is also prevented, as slopping is obviated, and the work greatly expedited by the action of the device.

All the strained juice which enters the receiver A is allowed to escape through a conduit that may be attached to the lower side of the box, as at $u$, or any other point desired, which will be most convenient for the transfer of the juice to the sulphuring apparatus, which is the next stage in the manufacture of sugar from cane-juice.

Having thus described my invention, I claim as new and desire to secure by Letters Patent—

1. The combination, with an oblong receiving-box apertured below to discharge liquid, an oblong strainer-frame and a strainer thereon, both located on the receiving-box near its top edge, a rake which is adapted to reciprocate longitudinally on the strainer in the main frame, engaging said strainer at the juice-receiving end of the same and scraping across toward the discharge end of the frame, and a vibratory lever detachably connected to the rake-handle, of a screen-frame and screen thereon located in the juice-receiving box laterally of the main strainer-frame and below it, and thus adapted to catch and strain overflowing juice, which escapes through a slot in the side of the main strainer-frame, substantially as described.

2. In a cane-juice strainer, the combination, with a rectangular oblong juice-receiving box, an oblong rectangular main strainer-frame on said box having its sides lowest near the center, and a strainer-cloth on the lower edges of said frame extending from end to end thereof, which frame is apertured at one side for the discharge of surplus cane-juice, of a reciprocating rake which engages the strainer in one direction of its travel, a screen-frame which will receive the overflow from the main strainer-frame, and another screen-frame at the end of the main strainer-frame in a lower plane within the juice-receiving box, substantially as described.

3. In a cane-juice strainer, the combination, with a rectangular juice-receiving box which is apertured to discharge juice from below as it is received and a main strainer-frame having a reticulated strainer on its lower surface centrally depressed and level on the depresed portion, the frame being open at both ends, of a rake-head having a pusher-bar at right angles thereto, a reciprocating mechanism for the rake attached removably to the pusher-bar, and guide-bars pivoted at one end of each to the inner surface of the juice-receiving box, so as to have a limited vertical vibration at their other ends, on which guide-bars the rake-head will slide in one direction of its reciprocating movement and drop therefrom at the other end of its travel to return below the guide-bars resting on the strainer and scraping the coarse impurities of inducted cane-juice toward the opposite end of the strainer-frame, substantially as described.

WALTER C. HAZLIP.

Witnesses:
F. A. WOOD,
ROBT. TISDALE.